(12) United States Patent
Rathinasamy et al.

(10) Patent No.: US 12,327,957 B2
(45) Date of Patent: Jun. 10, 2025

(54) SYSTEMS AND METHODS FOR DETECTING MISSHAPEN RECEPTACLE CONNECTOR

(71) Applicant: Dell Products L.P., Round Rock, TX (US)

(72) Inventors: Shree Rathinasamy, Round Rock, TX (US); Elizabeth Raymond, Austin, TX (US); Jonathan F. Lewis, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 558 days.

(21) Appl. No.: 17/854,404

(22) Filed: Jun. 30, 2022

(65) Prior Publication Data

US 2024/0006823 A1    Jan. 4, 2024

(51) Int. Cl.
| | |
|---|---|
| *H01R 13/66* | (2006.01) |
| *G01N 21/95* | (2006.01) |
| *H01R 12/51* | (2011.01) |
| *H01R 12/70* | (2011.01) |

(52) U.S. Cl.
CPC ......... *H01R 13/6683* (2013.01); *G01N 21/95* (2013.01); *H01R 12/51* (2013.01); *H01R 12/7076* (2013.01)

(58) Field of Classification Search
None
See application file for complete search history.

(56) References Cited

U.S. PATENT DOCUMENTS

| | | | |
|---|---|---|---|
| 10,923,842 B1 * | 2/2021 | Lynn | H01R 12/58 |
| 2013/0089290 A1 * | 4/2013 | Sloey | G02B 6/3817 |
| | | | 385/74 |

* cited by examiner

*Primary Examiner* — David W Lambert
(74) *Attorney, Agent, or Firm* — Jackson Walker L.L.P.

(57) ABSTRACT

A receptacle connector may include a receptacle for receiving a corresponding edge connector of a device, a plurality of electrically-conductive pins configured to electrically couple to associated pins of the corresponding edge connector when the receptacle connector is populated with the device, an optical transmitter at a first end of the receptacle, and an optical receiver at a second end of the receptacle opposite the first end and arranged relative to the optical transmitter such that in an absence of misshape of the receptacle connector, the optical receiver receives at least a significant portion of electromagnetic energy generated by the optical transmitter.

21 Claims, 4 Drawing Sheets

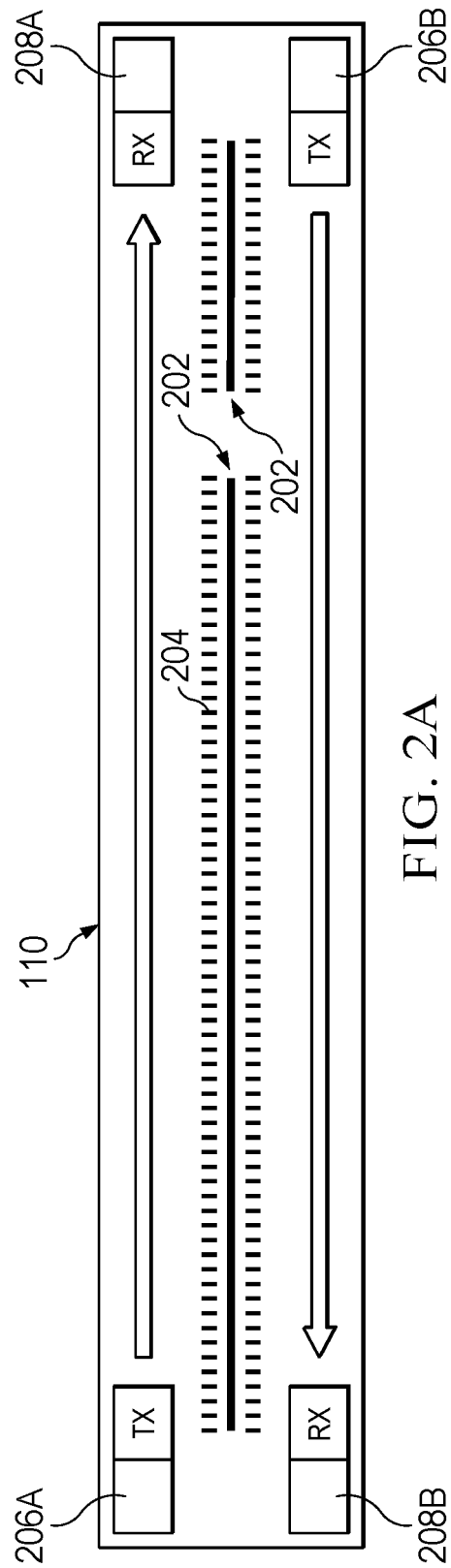
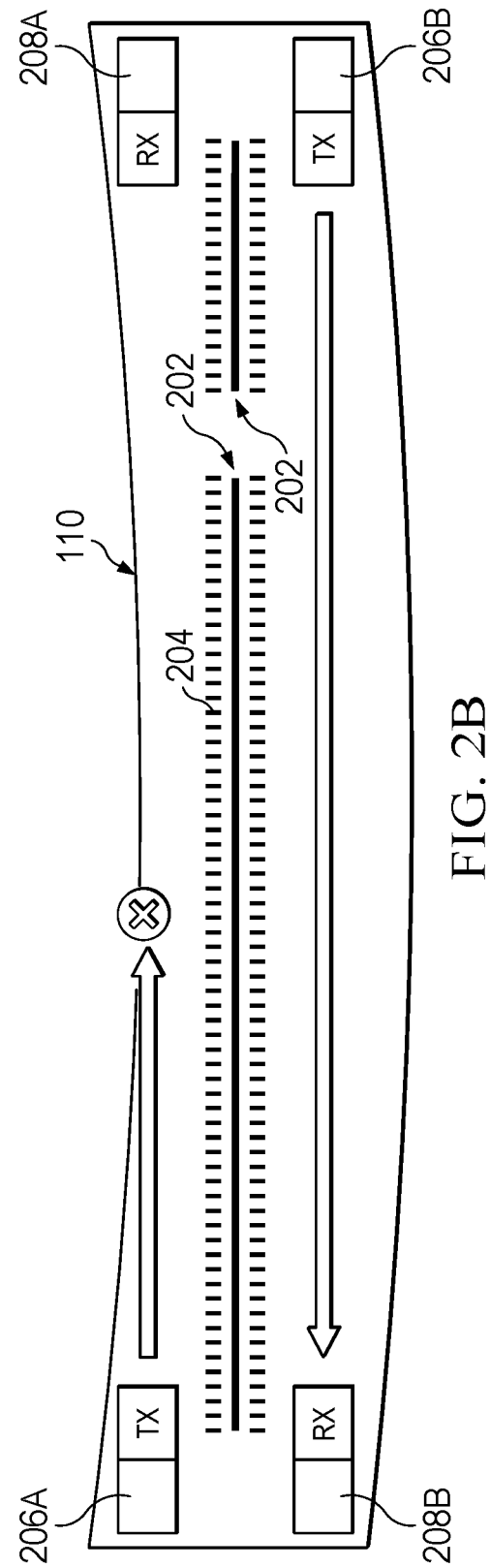
FIG. 2A
FIG. 2B

SYSTEMS AND METHODS FOR DETECTING MISSHAPEN RECEPTACLE CONNECTOR

TECHNICAL FIELD

The present disclosure relates in general to information handling systems, and more particularly to systems and methods for determining when a receptacle connector is misshapen.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is common in information handling systems to connect a device or circuit board to another circuit board via connectors. For example, one circuit board (e.g., a motherboard or backplane) may include a receptacle connector configured to mate with an edge connector of a device and/or other circuit board.

Due to repeated insertion and removal of devices from a receptacle connector and/or due to other reasons, a receptacle connector may become misshapen (e.g., warped or bent). Such misshaping may prevent pins of the receptacle connector from contacting corresponding pins of an edge connector, thus leading to loss of functionality of the receptacle connector and any device coupled thereto.

Over time, data centers and cloud enterprise environments are becoming denser due to advancements in compute, storage, and networking capabilities. With more and more components packed into an information handling system server, numerous issues may arise with respect to receptacle connectors in an information handling system. For example, visually inspecting various receptacle connectors in an information handling system may be impractical, particularly when such connectors are populated with devices. Accordingly, it may be challenging for a person to visually identify receptacle connectors that are misshapen.

SUMMARY

In accordance with the teachings of the present disclosure, the disadvantages and problems associated with existing approaches to identifying misshapen receptacle connectors may be reduced or eliminated.

In accordance with embodiments of the present disclosure, a receptacle connector may include a receptacle for receiving a corresponding edge connector of a device, a plurality of electrically-conductive pins configured to electrically couple to associated pins of the corresponding edge connector when the receptacle connector is populated with the device, an optical transmitter at a first end of the receptacle, and an optical receiver at a second end of the receptacle opposite the first end and arranged relative to the optical transmitter such that in an absence of misshape of the receptacle connector, the optical receiver receives at least a significant portion of electromagnetic energy generated by the optical transmitter.

In accordance with these and other embodiments of the present disclosure, an information handling system may include a circuit board and a receptacle connector mounted on the circuit board. The receptacle connector may include a receptacle for receiving a corresponding edge connector of a device, a plurality of electrically-conductive pins configured to electrically couple to associated pins of the corresponding edge connector when the receptacle connector is populated with the device, an optical transmitter at a first end of the receptacle, and an optical receiver at a second end of the receptacle opposite the first end and arranged relative to the optical transmitter such that in an absence of misshape of the receptacle connector, the optical receiver receives at least a significant portion of electromagnetic energy generated by the optical transmitter.

In accordance with these and other embodiments of the present disclosure, a method may be provided for use in a receptacle connector having a receptacle for receiving a corresponding edge connector of a device and a plurality of electrically-conductive pins configured to electrically couple to associated pins of the corresponding edge connector when the receptacle connector is populated with the device. The method may include transmitting, from an optical transmitter at a first end of the receptacle, electromagnetic energy. The method may also include receiving, by an optical receiver at a second end of the receptacle opposite the first end and arranged relative to the optical transmitter, at least a significant portion of electromagnetic energy generated by the optical transmitter in an absence of misshape of the receptacle connector.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 2A illustrates a top plan view of an example connector, in accordance with embodiments of the present disclosure;

FIG. 2B illustrates a top plan view of the example connector of FIG. 2A in a misshapen condition, in accordance with embodiments of the present disclosure.

DETAILED DESCRIPTION

Figure 1:
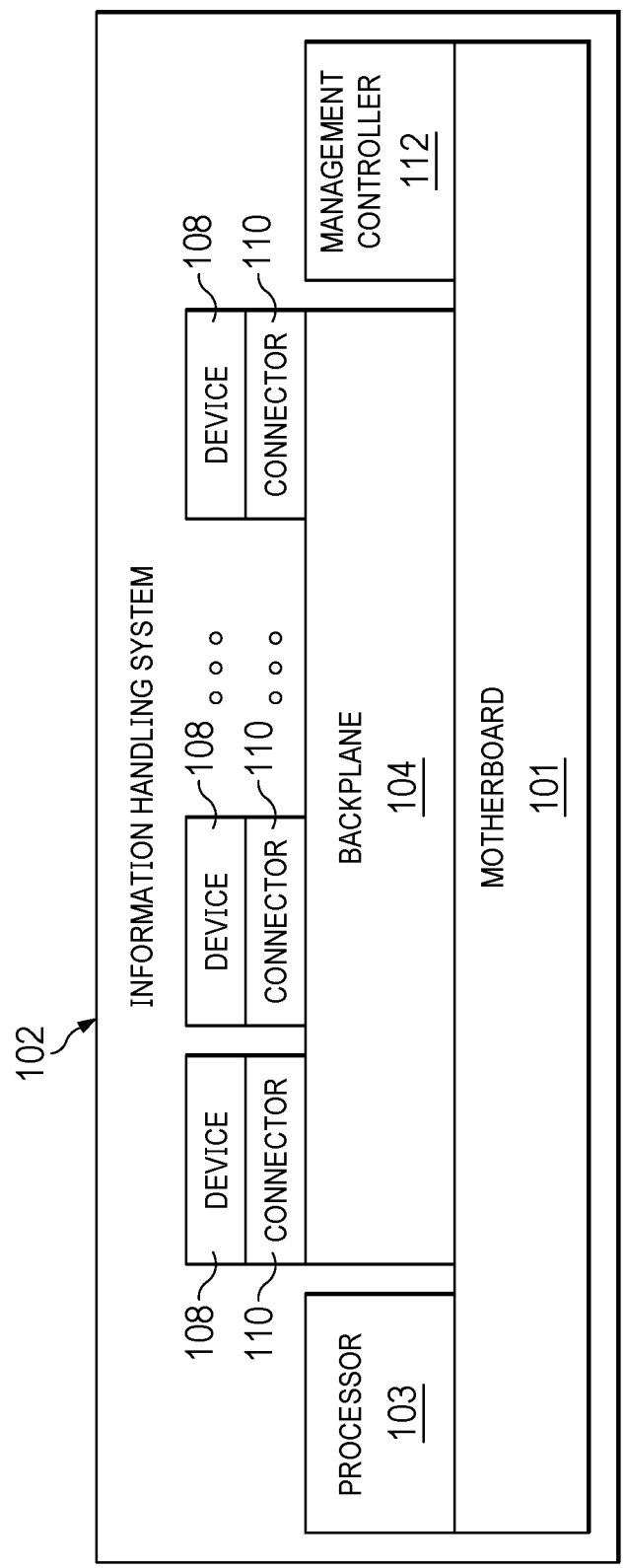
FIG. 1 illustrates a block diagram of selected components of an example information handling system, in accordance with embodiments of the present disclosure.
Figure 3A:
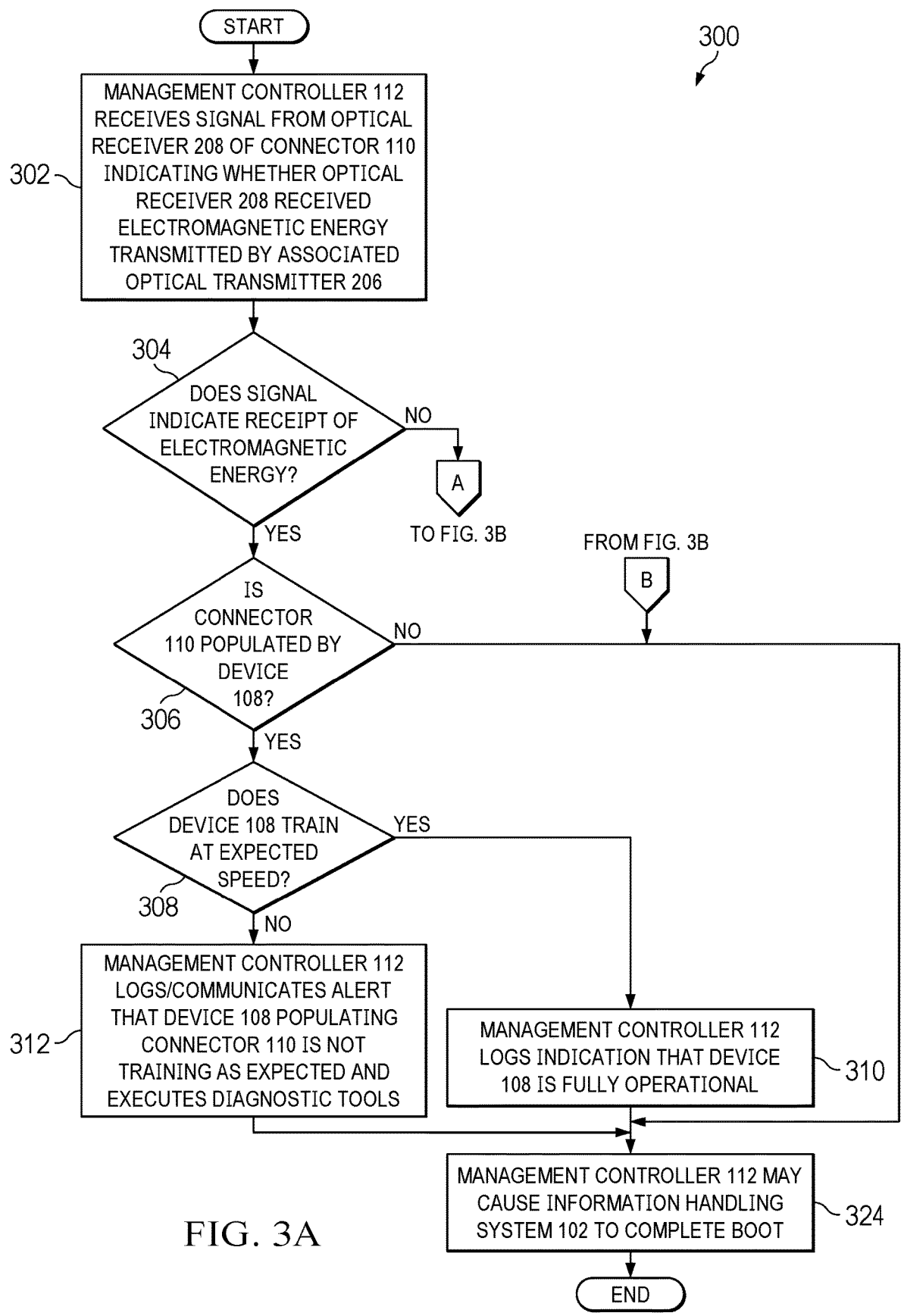
FIGS. 3A and 3B (which may be referred to collectively herein as "FIG. 3") illustrate a flow chart of an example method for taking actions in response to determining whether a misshapen connector exists, in accordance with certain embodiments of the present disclosure.
Figure 3B:
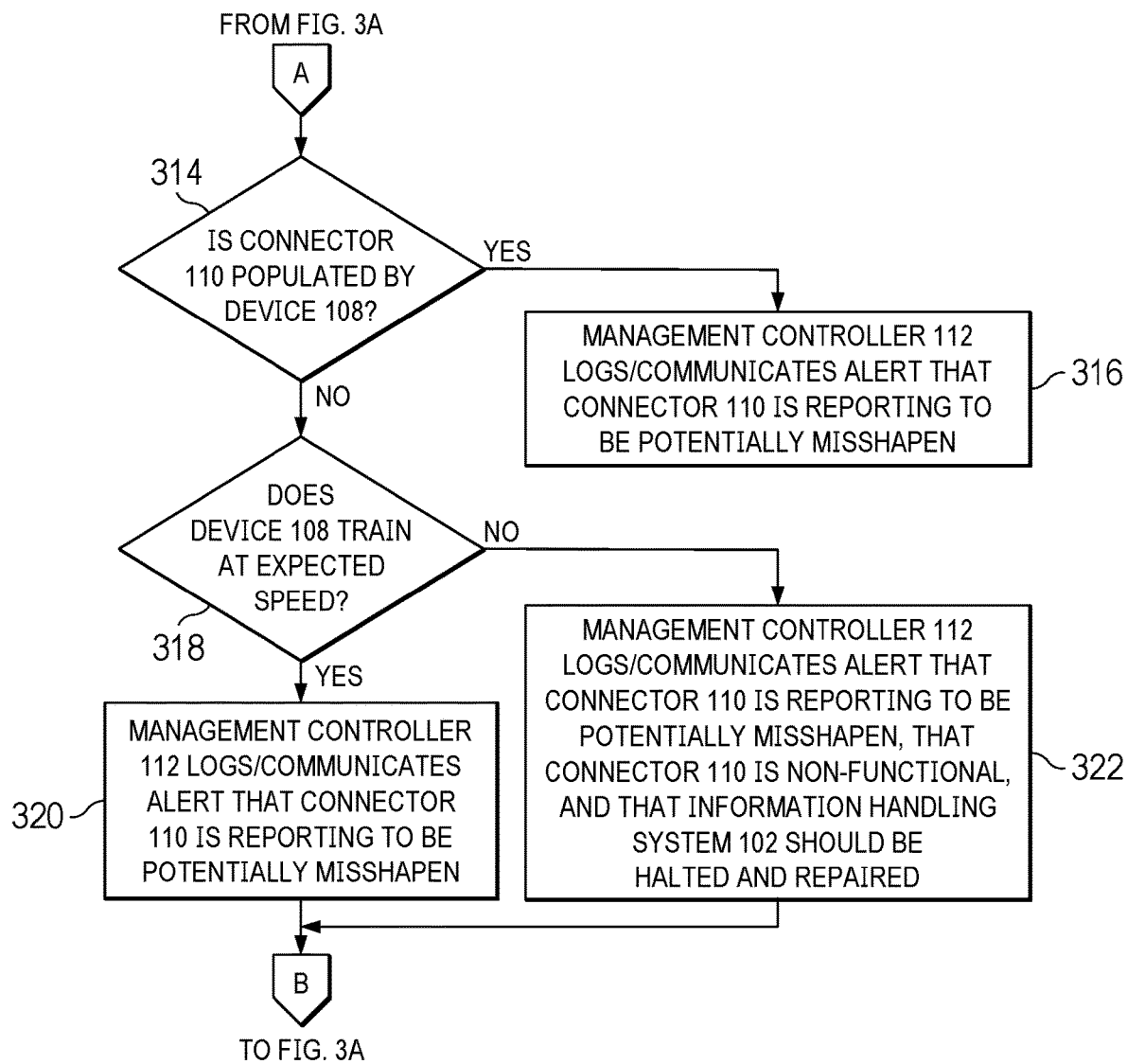

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

For the purposes of this disclosure, circuit boards may broadly refer to printed circuit boards (PCBs), printed wiring boards (PWBs), printed wiring assemblies (PWAs), etched wiring boards, and/or any other board or similar physical structure operable to mechanically support and electrically couple electronic components (e.g., packaged integrated circuits, slot connectors, etc.). A circuit board may comprise a substrate of a plurality of conductive layers separated and supported by layers of insulating material laminated together, with conductive traces disposed on and/or in any of such conductive layers, with vias for coupling conductive traces of different layers together, and with pads for coupling electronic components (e.g., packaged integrated circuits, slot connectors, etc.) to conductive traces of the circuit board.

FIG. 1 illustrates a block diagram of an example information handling system 102. In some embodiments, information handling system 102 may comprise a server. In other embodiments, information handling system 102 may comprise networking equipment for facilitating communication over a communication network. In yet other embodiments, information handling system 102 may comprise a personal computer, such as a laptop, notebook, or desktop computer.

As shown in FIG. 1, information handling system 102 may include a motherboard 101, a processor 103 mechanically and electrically coupled to motherboard 101, a backplane 104 mechanically and electrically coupled to motherboard 101, a plurality of connectors 110 mechanically and electrically coupled to backplane 104, a plurality of devices 108 each mechanically and electrically coupled to backplane 104 via a respective connector 110, and a management controller 112 mechanically and electrically coupled to motherboard 101.

Motherboard 101 may comprise a circuit board configured to provide structural support for one or more information handling resources of information handling system 102 and/or electrically couple one or more of such information handling resources to each other and/or to other electric or electronic components external to information handling system 102.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in a storage resource 108, memory and/or another component of information handling system 102.

Backplane 104 may comprise any system, device, or apparatus configured to interconnect information handling system 102 with information handling resources of information handling system 102. As shown, backplane 104 may have a plurality of connectors 110 mechanically and electrically coupled thereto.

A connector 110 may comprise any system, device, or apparatus mounted in a fixed position on backplane 104 and may be constructed to mechanically couple a corresponding device 108 to backplane 104 and to electrically couple such device 108 to backplane 104, processor 103, and/or other components of information handling system 102. Connector 110 may include a receptacle slot or other opening configured to removably receive a corresponding mating edge connector of a device 108. Example embodiments of connector 110 are set forth in greater detail with respect to FIGS. 2A and 2B below.

A device 108 may include any suitable information resource configured to carry out a defined functionality when mechanically and electrically coupled to a corresponding connector 110. Accordingly, a device 108 may include its own connector (not explicitly shown), for example an edge connector, configured to electrically and mechanically mate with a corresponding connector 110. Examples of a device 108 may include a memory module, a storage resource, or any other suitable device. As a particular example, in some embodiments, a device 108 may include a Peripheral Component Interface Express (PCIe) device.

Management controller 112 may be configured to provide management facilities for management of information handling system 102. Such management may be made by management controller 112 even if information handling system 102 is powered off or powered to a standby state. Management controller 112 may include a processor, a memory, and or other components. In certain embodiments, management controller 112 may include or may be an integral part of an embedded controller (EC), baseboard management controller (BMC), or a remote access controller (e.g., a Dell Remote Access Controller or Integrated Dell Remote Access Controller). As described in greater detail below, management controller 112 may be configured to exchange information with connectors 110, via a management channel (e.g., an Inter-Integrated Circuit or "I2C" interface) different from and physically isolated from a communication channel in which data may be exchanged between processor 103 and device 108. Such information may be indicative of whether a connector 110 has become misshapen.

In addition to motherboard 101, processor 103, backplane 104, devices 108, connectors 110, and management controller 112, information handling system 102 may include one or more other information handling resources.

FIG. 2A illustrates a top plan view of an example connector 110, in accordance with embodiments of the present disclosure. As shown in FIG. 2A, connector 110 may include slots 202 for mechanically retaining device 108 in connector 110 and pins 204 for electrically coupling to corresponding pins of a device 108. In addition, connector 110 may have integrated therein a line-of-sight sensing system for detecting whether connector 110 is misshapen.

As shown, the line-of-sight sensing system many include a first optical transmitter (TX) 206A on one end of the receptacle of connector 110 and a first optical receiver (RX) 208A on an opposite end of the receptacle of connector 110 and arranged such that optical electromagnetic energy communicated from first optical transmitter 206A is received by first optical receiver 208A in the absence of misshape of connector 110. Further, in some embodiments, the line-of-sight sensing system many include a second optical transmitter (TX) 206B on one end of the receptacle of connector 110 and a second optical receiver (RX) 208B on an opposite end of the receptacle of connector 110 and arranged such that optical electromagnetic energy communicated from second optical transmitter 206B is received by second optical receiver 208B in the absence of misshape of connector 110.

Examples of an optical transmitter 206 may include a light-emitting diode, a laser, a Light Fidelity (Li-Fi) transmitter, or any other transmitter configured to generate electromagnetic energy at optical frequencies (e.g., within the human-visible spectrum or near such spectrum, such as infrared or ultraviolet frequencies). Examples of an optical receiver 208 may include a photodetector, photodiode, solar cell, Li-Fi receiver, or any other receiver configured to receive electromagnetic energy at optical frequencies.

In operation, optical transmitters 206 may generate electromagnetic energy at one or more optical frequencies and, in the absence of misshape of connector 110, all or a significant portion of the electromagnetic energy generated by an optical transmitter 206 will be received by its corresponding optical receiver 208. Responsive to receiving such electromagnetic energy, an optical receiver 208 may communicate a signal to management controller 112 indicating receipt of the electromagnetic energy, which may further indicate the absence of misshape of connector 110.

However, when connector 110 is misshapen (e.g., bent or warped) as shown in FIG. 2B, a significant amount of the electromagnetic energy generated by at least one of optical transmitters 206 may be blocked by portions of connector 110 (e.g., walls of the receptacle of connector 110), such that a corresponding optical receiver 208 fails to receive any significant portion of the electromagnetic energy. Responsive to failure to receive such electromagnetic energy, an optical receiver 208 may communicate a signal to management controller 112 indicating failure to receive the electromagnetic energy, which may further indicate that connector 110 is misshapen. When connector 110 is determined to be misshapen, management controller 112 may take a remedial action, such as communicating to a user or administrator of information handling system 102 an alert indicating that connector 110 is misshapen and/or disabling the connector from data communication operations.

In embodiments in which optical transmitters 206 and optical receivers 208 are implemented as Li-Fi transmitters and Li-Fi receivers, respectively, such Li-Fi transmitters may be configured to transmit a sequence of data (e.g., a continuing series of binary 1's). Because Li-Fi requires line-of-sight communication between transmitter and receiver, when connector 110 maintains its integrity, communications between Li-Fi transmitters and Li-Fi receivers may be unhindered. However, when connector 110 is warped or bent, one or more of the Li-Fi receivers may encounter a break in the transmission of the data sequence. Once communication is hindered, such indication may be communicated to management controller 112.

FIG. 3 illustrates a flow chart of an example method 300 for taking actions in response to determining whether a misshapen connector 110 exists, in accordance with certain embodiments of the present disclosure. According to one embodiment, method 300 may begin at step 302. As noted above, teachings of the present disclosure may be implemented in a variety of configurations of information handling system 102. As such, the preferred initialization point for method 300 and the order of the steps comprising method 300 may depend on the implementation chosen.

At step 302, prior to boot of information handling system 102, management controller 112 may receive a signal from an optical receiver 208 of a connector 110 indicating whether such optical receiver 208 received a significant portion of the electromagnetic energy transmitted by its associated optical transmitter 206. At step 304, management controller 112 may determine whether the signal indicates receipt of the significant portion of the electromagnetic energy. If the signal indicates receipt of the significant portion of the electromagnetic energy, method 300 may proceed to step 306. Otherwise, method 300 may proceed to step 314.

At step 306, management controller 112 may determine if connector 110 is populated by a device 108 (e.g., by reading registers, such as PCIe slot registers, for connector 110). If connector 110 is populated by a device 108, method 300 may proceed to step to step 308. Otherwise, method 300 may proceed to step 324.

At step 308, management controller 112 may determine if device 108 populating connector 110 is training at its expected speed. If device 108 populating connector 110 is training at its expected speed, method 300 may proceed to step 310. Otherwise, method 300 may proceed to step 312.

At step 310, management controller 112 may log an indication that device 108 is fully operational. After completion of step 310, method 300 may proceed to step 324.

At step 312, management controller 112 may log and/or communicate an alert to a user or administrator of information handling system 102 that device 108 populating connector 110 is not training as expected and may execute diagnostic tools to determine the reasons for failure to train as expected. After completion of step 312, method 300 may proceed to step 324.

At step 314, management controller 112 may determine if connector 110 is populated by a device 108 (e.g., by reading registers, such as PCIe slot registers, for connector 110). If connector 110 is populated by a device 108, method 300 may proceed to step to step 318. Otherwise, method 300 may proceed to step 316.

At step 316, management controller 112 may log and/or communicate an alert to a user or administrator of information handling system 102 that connector 110 is reporting to be potentially misshapen. However, because connector 110 is unpopulated, information handling system 102 may still be used until it can be taken offline in order to repair or replace connector 110. After completion of step 316, method 300 may proceed to step 324.

At step 318, management controller 112 may determine if device 108 populating connector 110 is training at its expected speed. If device 108 populating connector 110 is training at its expected speed, method 300 may proceed to step 320. Otherwise, method 300 may proceed to step 322.

At step 320, management controller 112 may log and/or communicate an alert to a user or administrator of information handling system 102 that connector 110 is reporting to be potentially misshapen. However, because device 108 populating connector 110 is reporting to have trained as expected, information handling system 102 may still be used until it can be taken offline in order to repair or replace connector 110. After completion of step 320, method 300 may proceed to step 324.

At step 322, management controller 112 may log and/or communicate an alert to a user or administrator of information handling system 102 that connector 110 is reporting to be potentially misshapen, that connector 110 is non-functional, and that information handling system 102 should be halted and repaired. After completion of step 322, method 300 may proceed to step 324.

At step 324, management controller 112 may cause information handling system 102 to complete boot. After completion of step 324, method 300 may end.

Although FIG. 3 discloses a particular number of steps to be taken with respect to method 300, method 300 may be executed with greater or lesser steps than those depicted in FIG. 3. In addition, although FIG. 3 discloses a certain order of steps to be taken with respect to method 300, the steps comprising method 300 may be completed in any suitable order.

Method 300 may be implemented using information handling system 102 or any other system operable to implement method 300. In certain embodiments, method 300 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A receptacle connector comprising:
   a receptacle for receiving a corresponding edge connector of a device;
   a plurality of electrically-conductive pins configured to electrically couple to associated pins of the corresponding edge connector when the receptacle connector is populated with the device;
   an optical transmitter at a first end of the receptacle; and an optical receiver at a second end of the receptacle opposite the first end and arranged relative to the optical transmitter such that in an absence of misshape of the receptacle connector, the optical receiver receives at least a significant portion of electromagnetic energy generated by the optical transmitter.

2. The receptacle connector of claim 1, wherein the optical transmitter and optical receiver are further arranged relative to one another such that in a presence of significant misshape of the receptacle connector, the optical receiver receives less than the significant portion of electromagnetic energy generated by the optical transmitter.

3. The receptacle connector of claim 1, further comprising:
a second optical transmitter at one of the first end and the second end; and
a second optical receiver on the other of the first end and second end and arranged relative to the second optical transmitter such that in the absence of misshape of the receptacle connector, the second optical receiver receives at least a significant portion of electromagnetic energy generated by the second optical transmitter.

4. The receptacle connector of claim 1, wherein the optical receiver is further configured to communicate a signal indicative of whether the optical receiver receives at least the significant portion of electromagnetic energy generated by the optical transmitter.

5. The receptacle connector of claim 1, wherein the optical transmitter comprises a light-emitting diode or a laser.

6. The receptacle connector of claim 1, wherein the optical receiver comprises a photodetector, a photodiode, or a solar cell.

7. The receptacle connector of claim 1, wherein:
the optical transmitter comprises a Li-Fi transmitter; and
the optical receiver comprises a Li-Fi receiver.

8. An information handling system comprising:
a circuit board; and
a receptacle connector mounted on the circuit board and comprising:
  a receptacle for receiving a corresponding edge connector of a device;
  a plurality of electrically-conductive pins configured to electrically couple to associated pins of the corresponding edge connector when the receptacle connector is populated with the device;
  an optical transmitter at a first end of the receptacle; and
  an optical receiver at a second end of the receptacle opposite the first end and arranged relative to the optical transmitter such that in an absence of misshape of the receptacle connector, the optical receiver receives at least a significant portion of electromagnetic energy generated by the optical transmitter.

9. The information handling system of claim 8, wherein the optical transmitter and optical receiver are further arranged relative to one another such that in a presence of significant misshape of the receptacle connector, the optical receiver receives less than the significant portion of electromagnetic energy generated by the optical transmitter.

10. The information handling system of claim 8, the connector further comprising:
a second optical transmitter at one of the first end and the second end; and
a second optical receiver on the other of the first end and second end and arranged relative to the second optical transmitter such that in the absence of misshape of the receptacle connector, the second optical receiver receives at least a significant portion of electromagnetic energy generated by the second optical transmitter.

11. The information handling system of claim 8, further comprising a management controller, and wherein the optical receiver is further configured to communicate a signal to the management controller indicative of whether the optical receiver receives at least the significant portion of electromagnetic energy generated by the optical transmitter.

12. The information handling system of claim 8, wherein the optical transmitter comprises a light-emitting diode or a laser.

13. The information handling system of claim 8, wherein the optical receiver comprises a photodetector, a photodiode, or a solar cell.

14. The information handling system of claim 8, wherein:
the optical transmitter comprises a Li-Fi transmitter; and
the optical receiver comprises a Li-Fi receiver.

15. A method, in a receptacle connector having a receptacle for receiving a corresponding edge connector of a device and a plurality of electrically-conductive pins configured to electrically couple to associated pins of the corresponding edge connector when the receptacle connector is populated with the device;
transmitting, from an optical transmitter at a first end of the receptacle, electromagnetic energy; and
receiving, by an optical receiver at a second end of the receptacle opposite the first end and arranged relative to the optical transmitter, at least a significant portion of electromagnetic energy generated by the optical transmitter in an absence of misshape of the receptacle connector.

16. The method of claim 15, further comprising receiving, by the optical receiver, less than the significant portion of electromagnetic energy generated by the optical transmitter in a presence of significant misshape of the receptacle connector.

17. The method of claim 15, further comprising:
transmitting, from a second optical transmitter at one of the first end and the second end, electromagnetic energy; and
receiving, by a second optical receiver at the other of the first end and the second end, at least a significant portion of electromagnetic energy generated by the second optical transmitter in an absence of misshape of the receptacle connector.

18. The method of claim 15, further comprising communicating a signal from the optical receiver indicative of whether the optical receiver receives at least the significant portion of electromagnetic energy generated by the optical transmitter.

19. The method of claim 15, wherein the optical transmitter comprises a light-emitting diode or a laser.

20. The method of claim 15, wherein the optical receiver comprises a photodetector, a photodiode, or a solar cell.

21. The method of claim 15, wherein:
the optical transmitter comprises a Li-Fi transmitter; and
the optical receiver comprises a Li-Fi receiver.

* * * * *